Patented Nov. 14, 1950

2,529,523

UNITED STATES PATENT OFFICE 2,529,523

MINERAL LUBRICATING OIL COMPOSITION

Franklin M. Watkins, Flossmoor, Ill., assignor to Sinclair Refining Company, New York, N. Y., a corporation of Maine No Drawing. Application April 29, 1947,
Serial No. 744,785

4 Claims. (Cl. 252—33)

My invention relates to a reaction product which is generally useful as a wetting, cleansing and dispersing agent but which is particularly useful as a detergent in mineral lubricating oils. My invention embraces particularly lubricating compositions containing the reaction product in proportions at which it is effective as a detergent.

The product is produced from a petroleum oil or petroleum oil fraction containing aromatic hydrocarbons having alkyl side chains of substantial length, by which I mean alkyl side chains of from about 10 to about 26 or more carbon atoms, and represents an oil concentrate of compounds conforming to the formula

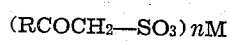

$(RCOCH_2—SO_3)_nM$ where R represents alkaryl radicals derived from the oil, $n$ is 1 or 2 and M represents an alkali or alkaline earth metal. I prefer that the metal component of the compounds be sodium, calcium or barium.

Where sodium is the metal component desired, I customarily prepare the product by reacting the oil first with chloracetyl chloride in the presence of a suitable solvent and a Friedel-Crafts type catalyst, most suitably aluminum chloride, and then with sodium sulphite in aqueous or aqueous alcoholic solution. If calcium or barium is desired as the metal component, the product prepared as described may be further reacted with a salt of the alkaline earth metal, most suitably the chloride or bromide, the sodium being thereby replaced with the alkaline earth metal.

These several reactions may be illustrated by the following equations in which RH represents alkylated aromatic hydrocarbons in the oil, R alkaryl radicals derived from these hydrocarbons, M' alkali metal and M'' alkaline earth metal:

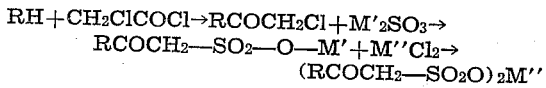

$RH + CH_2ClCOCl \rightarrow RCOCH_2Cl + M'_2SO_3 \rightarrow$
$RCOCH_2—SO_2—O—M' + M''Cl_2 \rightarrow$
$(RCOCH_2—SO_2O)_2M''$ It is my belief that the oil solubility of the metal sulfo-compounds obtains by reason of the sulfogroup being positioned alpha with reference to the carbonyl oxygen which would allow of chelation between the metal and the carbonyl oxygen, but, of course, I am not to be held for the accuracy of this hypothesis.

Aside from its detergent properties, the reaction product, depending principally upon the oil from which it is prepared and upon the metal component, may impart a rust-inhibiting property to lubricating oils to which it is added or may promote the effectiveness of rust-inhibitors used in conjunction with it. Thus, the product as prepared to contain calcium or barium will generally materially enhance the rust-inhibiting action of glyceryl monoesters of high molecular weight fatty acids, such as stearic, oleic, palmitic and the like.

Mineral oil compositions according to the invention may contain the reaction product in any effective proportion. Generally, however, I add the reaction product in such an amount that the blend will contain from about 0.5 to 2.0% on the total weight of the oil or the metal sulfo-compounds. Addends other than the reaction product may be present in the composition. Thus, there may be present, as previously indicated, one or more rust inhibitors, or there may be present a viscosity index improver, for example, or an oxidation inhibitor, such as a turpentine-phosphorus sulfide reaction product, or a pour depressor, or all of these.

My invention is illustrated by the following examples which are not to be taken as in any way limitative of the scope thereof. Examples 1 to 6, inclusive, illustrate the preparation of the reaction product while Examples 6, 7, and 8 illustrate the effectiveness of lubricating compositions containing the product as an addend.

EXAMPLE I

The laboratory tests on the oil used were as follows:

| | |
|---|---|
| Gravity | 26.9 |
| Flash | 455 |
| Fire | 530 |
| Vis. @ 100 | 434 |
| Vis. @ 210 | 57.3 |
| V. I. | 84 |
| Pour | 10 |
| Color | 3½+ |
| Carbon residue | .03 |
| Acid No. | 0.0 |
| Molecular weight (approximate) | 410 |

The equipment included a 3-liter 3-neck flask, mercury seal stirrer, dropping funnel, reflux condenser, and a drying tube.

312 grams (2.34 moles) anhydrous aluminum chloride was mixed in the reaction flask with 1,000 c. c. isopentane. 2,460 grams (6 moles) of the oil was mixed with 177 grams (1.56 moles) of chloracetyl chloride. The mixture of oil and chloracetyl chloride was added dropwise to the aluminum chloride over about one and one-half hours with mixing. The reaction started at room temperature but proceeded with refluxing of the isopentane. After two hours additional stirring, the mixture was poured into one and a half liters of ice and water with stirring. 500 c. c. of ether was added and the mixing continued two hours. The organic phase was separated, washed with cold dilute hydrochloric acid, followed by a water wash, a cold dilute sodium carbonate wash, and a final water wash. The oil layer was filtered and the solvent was removed by topping finally under vacuum over a steam bath. The topped oil contained 1.8% chloride, a yield of 84% of chloracetylated aromatics.

1,545 grams of the solution prepared as just described, containing 0.78 mole of chloracetylated aromatics, was charged to a one gallon autoclave. 378 grams (3 moles) anhydrous sodium sulfite in 1,500 c. c. water and 750 c. c. Formula 30 alcohol were added and the mixture reacted at 300° F. ± 10° F. for 15 hours with stirring. At the termination of the reaction, the water layer was found to contain unreacted sodium sulfite and sodium chloride. The dehydrated and filtered oil (1,220 grams) contained 0.97% sodium, 1.09% sulfur, and 0.43% chlorine. Conversion of chlorine in the chloracetylated aromatic molecules to the sodium sulfonate was 86%.

EXAMPLE II 300 grams of the sodium sulfo-acetylated oil from Example I, containing 2.92 grams sodium, was mixed with 8.33 grams calcium chloride (103% of the theoretical amount) in a 20% water solution (34 c. c. $H_2O$) for 2 hours at 160° F. 2.63 grams calcium chloride (about 30% of the theoretical amount) in 20% water solution (10.5 c. c. $H_2O$) was then added and the mixing continued an additional 2 hours at 160° F. The oil was dehydrated by heating to 280° F. and filtered. The filtrate contained 0.91% calcium; 0.07% sodium, 0.72% chlorine, and 1.24% sulfur.

EXAMPLE III

A chloracetylation reaction was carried out with the oil of Example I using the same reaction conditions and quantities of reactants, except that 450 c. c. carbon disulfide was used as a solvent in place of the iso-pentane. The reaction temperature, controlled by the refluxing solvent, was approximately 46° C., the boiling point of the carbon disulfide. The percent chlorine in the chloracetylated oil was 1.88%, or 88% of the theoretical.

1545 grams of this oil containing 0.82 mole of chloracetylated aromatics was charged to an autoclave, and reacted in the same manner as that in Example I. The dehydrated oil weighed 1350 grams. The analysis of the oil was 0.66% sodium, 0.34% chlorine, and 1.17% sulfur. The conversion of chlorine in the chloracetylated aromatics to the sodium sulfonate was about 56%.

EXAMPLE IV 6132 grams of sodium sulfo-acetylated oil, containing 46.16 grams sodium, was reacted with 128 grams calcium chloride (115% of the theoretical amount) in 425 c. c. of water. The oil was heated with mixing to 220° F. for two hours, after which time the mixture was allowed to settle and the calcium chloride solution drawn off. The process was repeated three times. The oil was washed with 70 volume % of $H_2O$ and allowed to settle. The oil layer was dehydrated by heating to 280° F. and filtered. The filtrate (5200 grams) contained 0.48% calcium, 0.02% sodium, 0.37% chlorine, 0.89% sulfur, and had an acid number of 1.68. The filtrate was neutralized with 188 grams of calcium hydroxide with 5% water added (270 c. c. $H_2O$) and the mixture stirred 2 hours. Dehydration was accomplished by heating to 280° F. The analysis of the dry, filtered oil showed 0.73% calcium, 0.02% sodium, 0.18% chlorine, and a 1.6 (basic) neutralization number.

EXAMPLE V

An oil of the following properties was reacted with chloracetyl chloride and with sodium sulphite, the procedure conforming to Example I:

| | |
|---|---|
| Gravity | 27.0 |
| Flash | 545 |
| Fire | 635 |
| Vis. @ 100 | 1752 |
| Vis. @ 210 | 126.9 |
| V. I. | 96 |
| Pour | 5 |
| Color | 6+ |
| Carbon residue | 0.36 |
| Acid No. | 0.0 |

250 grams of the sodium sulfo-acetylated oil, containing 0.04 mole of sodium sulfo-acetylated aromatics, was heated to 180° F. and 5.63 grams (115% of theoretical) of barium chloride in 200 c. c. of a 50:50 blend of isopropanol and water was added. The mixture was stirred and heated to 195° F. It was then allowed to settle at 175° F. for three hours and to cool overnight. The alcohol water layer was removed and a second treat made with 115% of theoretical barium chloride solution. The mixture was heated to 195° F. and allowed to stand overnight at 170° F. The alcohol-water layer was removed, 225 c. c. of water added and the mixture stirred and heated to 210° F. and allowed to settle at 210° F. overnight. The emulsion formed had not broken, so the mixture was transferred to a separatory funnel and heated with a steam finger until separation was complete. The oil layer was heated to 300° F. for 30 minutes and filtered hot. The product contained 1.43% barium (1.1% theoretical), 0.01% sodium, 0.15% chlorine, and 0.56% sulfur.

EXAMPLE VI 350 grams of the sodium sulfo-acetylated oil of Example V, containing 0.056 mole of sodium sulfo-acetylated aromatic molecules, was subjected to two treats, each with 3.6 grams (115% theoretical) of calcium chloride in 200 c. c. of 50:50 isopropanol and water mixture. 300 c. c. of water was used in washing the oil layer. The product contained 0.34% calcium (0.32% theoretical), 0.04% sodium, 0.25% chlorine, and 0.74% sulfur.

EXAMPLE VII

The calcium-containing product of Example II was added to a lubricating oil in such amount as to give an oil-free sulfonate concentration of 1.4%. The following are the laboratory tests on the base oil and on the blend containing the addend:

| | | |
|---|---|---|
| Gravity | 30.4 | 29.7 |
| Flash | 400 | 395 |
| Fire | 455 | 450 |
| Vis. @ 100 | 154 | 174 |
| Vis. @ 210 | 43.1 | 44.5 |
| Viscosity index | 91.3 | 93.3 |
| Pour | 15 | 15 |
| Calcium, percent | | .051 |
| Phosphorus, percent | | .032 |
| Sulfur, percent | .18 | .38 |

The base oil and blend were subjected to a standard varnish and sludge rating test, designated in the art as the "L-4 Chevrolet Engine Test," with the following results:

*Varnish rating*

| | | |
|---|---|---|
| Piston skirts | 2.0 | 6.0 |
| Rocker arm cover plate | 8.0 | 9.0 |
| Push rod cover plate | 9.0 | 9.0 |
| Cylinder walls | 2.5 | 6.5 |
| Crankcase oil pan | 1.5 | 8.5 |
| Varnish Total | 23.0 | 39.0 |

*Sludge rating*

| | | |
|---|---|---|
| Rocker arm assembly | 2.0 | 9.0 |
| Rocker arm cover plate | 4.0 | 9.0 |
| Push rod cover plate | 5.5 | 8.5 |
| Oil screen | 7.5 | 10.0 |
| Crankcase oil pan | 5.5 | 9.5 |
| Sludge Total | 24.5 | 46.0 |
| Total Varnish and Sludge Rating | 47.5 | 85.0 |
| Bearing Loss (Mg/whole) | 718 | 49 |

*Used oil tests @ 36 hrs.*

| | | |
|---|---|---|
| Vis. rise @ 110° F. (%) | 112 | 46.5 |
| Acid No. | 8.2 | 1.35 |

EXAMPLE VIII

The properties of the base oil are given in Example V. Various blends were prepared and tested for their rust-inhibiting effect. In the test used, duplicate steel panels were coated with the blends and then placed in a cabinet maintained at 100% relative humidity and at a temperature of 120° F. Results of the test are given in the table below in which the number of hours represents the time elapsed before rust was first noticed on the panels.

| Additives | Oil-free Sulfonate Concentration | Humidity Cabinet Life in Hours |
|---|---|---|
| None | | Below 24 hrs. |
| 2% Glyceryl mono-oleate | | 360, 264 |
| 2% Glyceryl mono-oleate—Barium sulfo-acetylated oil.[1] | 0.5 | 600, 600 |
| 2% Glyceryl mono-oleate—Calcium sulfo-acetylated oil. | 1.0 | 1272+, 1488 |
| 2% Glyceryl mono-oleate—Calcium sulfo-acetylated oil.[2] | 1.5 | 1944, 1872 |

[1] From Example V.
[2] From Example VI.

I claim:
1. A lubricating composition comprising a mineral oil base and blended therewith, in a proportion adequate to impart a detergent property to the composition, a mineral oil concentrate of compounds conforming to the formula

$$(RCOCH_2-SO_3)_nM$$

where R represents alkaryl radicals derived from a mineral oil containing aromatic hydrocarbons having alkyl side chains of from about 10 to about 26 carbon atoms, $n$ is 1 or 2 and M is from the group consisting of the alkali and alkaline earth metals.

2. A lubricating composition comprising a mineral oil base and from 0.5 to 2.0% on the weight of the oil of compounds conforming to the formula $$RCOCH_2-SO_2-O-Na$$

where R represents alkaryl radicals derived from a mineral oil containing aromatic hydrocarbons having alkyl side chains of from about 10 to about 26 carbon atoms.

3. A lubricating composition comprising a mineral oil base and from 0.5 to 2.0% on the weight of the oil of compounds conforming to the formula $$(RCOCH_2-SO_3)_2Ca$$

where R represents alkaryl radicals derived from a mineral oil containing aromatic hydrocarbons having alkyl side chains of from about 10 to about 26 carbon atoms.

4. A lubricating composition comprising a mineral oil base and from 0.5 to 2.0% on the weight of the oil of compounds conforming to the formula $$(RCOCH_2-SO_3)_2Ba$$

where R represents alkaryl radicals derived from a mineral oil containing aromatic hydrocarbons having alkyl side chains of from about 10 to about 26 carbon atoms.

FRANKLIN M. WATKINS.

REFERENCES CITED

The following references are of record in the file of this patent:

UNITED STATES PATENTS

| Number | Name | Date |
|---|---|---|
| 1,932,178 | Guenther | Oct. 24, 1933 |
| 2,106,716 | Bruson | Feb. 1, 1938 |
| 2,366,133 | Suter | Dec. 26, 1944 |